(12) United States Patent
Motschi (10) Patent No.: US 10,639,726 B2
(45) Date of Patent: May 5, 2020

(54) FLEXIBLE COUPLING FOR ATTACHING A COLLET TO A DRAW BAR

(71) Applicant: Schaublin SA, Delémont (CH)

(72) Inventor: René Motschi, Oberbuchsiten (CH)

(73) Assignee: Schaublin SA, Delémont (CH)

( * ) Notice: Subject to any disclaimer, the term of this patent is extended or adjusted under 35 U.S.C. 154(b) by 64 days.

(21) Appl. No.: 15/618,389

(22) Filed: Jun. 9, 2017

(65) Prior Publication Data

US 2017/0355024 A1     Dec. 14, 2017

Related U.S. Application Data

(60) Provisional application No. 62/349,978, filed on Jun. 14, 2016.

(51) Int. Cl.
  *B23B 31/20*     (2006.01)
  *B23B 31/36*     (2006.01)
  (Continued)

(52) U.S. Cl.
  CPC ............ *B23B 31/202* (2013.01); *B23B 31/20* (2013.01); *B23B 31/36* (2013.01); *B23B 31/008* (2013.01);
  (Continued)

(58) Field of Classification Search
  CPC ..... B23B 31/20; B23B 31/265; B23B 31/207; B23B 31/404; B23B 31/406;
  (Continued)

(56) References Cited

U.S. PATENT DOCUMENTS

| 1,241,177 A | 9/1917 | Watts |
| 2,038,602 A * | 4/1936 | Redinger .............. B23B 31/202 |
| | | 279/32 |

(Continued)

FOREIGN PATENT DOCUMENTS

| CN | 103707215 A | 4/2014 |
| CN | 203973255 U | 12/2014 |

(Continued)

OTHER PUBLICATIONS

Extended European Search Report issued in corresponding EP Application No. 17175701.6, dated Dec. 21, 2017, pp. 1-7.

*Primary Examiner* — Eric A. Gates
*Assistant Examiner* — Chwen-Wei Su
(74) *Attorney, Agent, or Firm* — Murtha Cullina LLP (57) ABSTRACT

A flexible coupling for attaching a collet to a draw bar includes a draw bar having a first longitudinal axis and a first coupling portion. The first coupling portion includes two or more legs spaced apart from one another with each of the legs having first coupling surface formed thereon. The flexible coupling includes a collet having a second longitudinal axis and a clamping portion proximate one end of the collet. The collet includes a second coupling portion proximate a second end of the collet. The second coupling portion has a second coupling surface formed thereon and configured in a shape complementary to the first coupling surface so that the first coupling surfaces moveably engage the second coupling surface such that the first longitudinal axis and the second longitudinal axis are coaxial when an axial force is applied to the draw bar and the collet.

11 Claims, 5 Drawing Sheets

(51) Int. Cl.
*B23B 31/00* (2006.01)
*B23B 31/08* (2006.01)
*B23B 31/26* (2006.01)

(52) U.S. Cl.
CPC ............. *B23B 31/08* (2013.01); *B23B 31/265* (2013.01); *B23B 2231/204* (2013.01); *B23B 2231/2018* (2013.01); *B23B 2231/2089* (2013.01); *B23B 2260/068* (2013.01); *Y10T 279/17529* (2015.01)

(58) Field of Classification Search
CPC ........ B23B 2231/20; B23B 2231/2083; B23B 2231/22; B23B 2231/2018; B23B 2231/204; B23B 2260/068; B23B 2260/034; B23B 31/202; Y10T 279/17529; Y10T 279/25; Y10T 279/17017
See application file for complete search history.

(56) References Cited

U.S. PATENT DOCUMENTS

| | | | |
|---|---|---|---|
| 2,463,165 A | 3/1949 | Felin et al. | |
| 2,675,242 A | 4/1954 | Olson | |
| 2,776,839 A | 1/1957 | Benjamin et al. | |
| 2,940,765 A | 6/1960 | Appleby | |
| 3,014,391 A | 12/1961 | Fuhrman | |
| 3,210,836 A * | 10/1965 | Johanson | H05K 13/0491 |
| | | | 279/51 |
| 3,583,714 A * | 6/1971 | Weltzer | B23B 31/202 |
| | | | 279/136 |
| 4,762,447 A * | 8/1988 | Marantette | B23B 31/205 |
| | | | 279/4.04 |
| 5,480,164 A | 1/1996 | Murphy | |
| 5,806,859 A * | 9/1998 | Saccomanno, III | B23B 31/207 |
| | | | 279/143 |
| 6,036,415 A * | 3/2000 | Sheehan | B23B 31/205 |
| | | | 279/4.08 |
| 6,640,679 B1 | 11/2003 | Roberts, Jr. | |
| 7,137,632 B2 * | 11/2006 | Smith | B23B 31/205 |
| | | | 279/4.08 |
| 9,586,268 B2 * | 3/2017 | McCluskey | B23B 31/207 |
| 2006/0232020 A1 | 10/2006 | Miller | |
| 2007/0286695 A1 * | 12/2007 | Boisvert | B23B 31/207 |
| | | | 409/131 |
| 2011/0217135 A1 | 9/2011 | Reinauer | |
| 2015/0273591 A1 | 10/2015 | Nakamura | |

FOREIGN PATENT DOCUMENTS

| | | | |
|---|---|---|---|
| CN | 105397534 A | 3/2016 | |
| CN | 205588146 U | 9/2016 | |
| DE | 102015119061 B3 | 12/2016 | |
| EP | 0179024 A1 * | 4/1986 | ........... B23B 31/207 |
| GB | 2137123 A * | 10/1984 | ........... B23B 31/006 |
| KR | 1020160102567 A | 8/2016 | |
| KR | 1020170000240 A | 1/2017 | |
| WO | 2013041118 A1 | 3/2013 | |
| WO | 2015155827 A1 | 10/2015 | |
| WO | 2017047558 A1 | 3/2017 | |

* cited by examiner

FIG. 5 ative Patent Application No. 62/349,978, entitled "A Flexible Coupling for Attaching a Collet to a Draw Bar," filed on Jun. 14, 2016, the entirety of which is incorporated by reference herein.

FLEXIBLE COUPLING FOR ATTACHING A COLLET TO A DRAW BAR

CROSS REFERENCE TO RELATED APPLICATIONS

The instant application is a non-provisional of, and claims priority benefit to, U.S. Provisional Patent Application No. 62/349,978, entitled "A Flexible Coupling for Attaching a Collet to a Draw Bar," filed on Jun. 14, 2016, the entirety of which is incorporated by reference herein.

FIELD OF THE INVENTION

This invention relates to a coupling for attaching a collet to a draw bar, and is more particularly related to a flexible coupling having movable segments that engage a mating portion of the coupling.

BACKGROUND

A collet is a device having two or more "jaws" between which an object such as a tool or a workpiece can be positioned. The jaws form a collar around the object. The jaws of the collet are configured to constrict around the object by deflecting radially inward. The jaws may be deflected radially inward by pushing a suitable mechanism (e.g., a collet adapter) around the circumference of the collet. In another type of collet called a draw-in collet, the collet is tapered and drawn into a sleeve (e.g., a collet adapter) by a draw bar to cause the jaws to constrict around the tool or workpiece. Collets are typically fabricated from steel, which allows the jaws to be sufficiently flexible relative to each other to allow the jaws to flex and hold the tool or workpiece.

The collet is held in a clamping device (e.g., a collet adapter and draw bar), which is connected to a shaft that can be rotated, which in turn causes the tool or the workpiece to rotate. In instances in which a tool is clamped in the collet and rotated, the tool is made to engage or be engaged by a workpiece. In instances in which the workpiece is clamped in the collet and rotated, the workpiece engages or is engaged by a tool.

The rotational accuracy of the tool or the workpiece affects the process of removing swarf (e.g., metal chips) from the workpiece. In particular, the rotational accuracy of the tool or the workpiece is typically a function of concentricity along the axis of rotation. The concentricity achieved with mechanical clamping is often inadequate or compromised during rotation, thereby resulting in run-out. Such run-out can detrimentally affect the finished workpiece. Multiple cycles of operation of the pulling device can cause the concentricity to change for each cycle, thereby causing an inconsistent and unacceptable run-out accuracy.

The collet is removably attached to the draw bar by a suitable fastener. However, there is typically a gap between the collet and the draw bar. This gap causes variation of concentricity between the collet and the draw bar. If there is a variation of concentricity, there is also a variation of the contact point and the direction of the draw-in force. This results in a run-out on the clamped tool or workpiece. There are many reasons for variation of concentricity between drawbar and collet, such as variation of friction in the clamping system of the machine tool, variation of clamping force, such as pressure, direction, pulsation, vibrations, machining forces or other external influences on the tool or the workpiece, different angular orientation of the spindle between different clamping cycles, influence of dust, chips and temperature.

Thus, there is a need for an improved connection between the collet and draw bar and an enhanced holding and guiding of the collet in the collet adaptor.

SUMMARY

There is disclosed herein a flexible coupling for attaching a collet to a draw bar. The flexible coupling includes a draw bar having a first longitudinal axis and a first coupling portion proximate one end of the draw bar. The draw bar includes a mounting portion proximate an opposite end of the draw bar to removably secure the draw bar to a pulling device of a machine tool. The first coupling portion includes two or more legs spaced apart from one another with each of the legs having a first coupling surface formed thereon. The flexible coupling includes a collet having a second longitudinal axis and a clamping portion proximate one end of the collet. The collet includes a second coupling portion proximate a second end of the collet. The second coupling portion has a second coupling surface formed thereon and configured in a shape complementary to the first coupling surface so that the first coupling surfaces moveably engage the second coupling surface such that the first longitudinal axis and the second longitudinal axis are coaxial when an axial force is applied to the draw bar and the collet.

In one embodiment, the first coupling surface has a first threaded area formed thereon and the second coupling surface has a second threaded area formed thereon. In one embodiment the first threaded area is an internal thread and the second threaded area is an external thread. In one embodiment, the first threaded area is an external thread and the second threaded area is an internal thread. In one embodiment, the first threaded area and the second threaded area are of a buttress thread configuration.

There is also disclosed herein a method for connecting the collet to the drawbar of the machine tool. The method includes providing a machine tool having a spindle and a pulling device therein; and providing the collet adapter. The method also includes providing the draw bar that has the first longitudinal axis and the first coupling portion of the flexible coupling proximate one end of the draw bar. The draw bar includes the mounting portion proximate the opposite end of the draw bar. The first coupling portion includes the two or more legs spaced apart from one another. The legs have the first coupling surface formed thereon. The method also includes providing the collet that has the second longitudinal axis and the clamping portion proximate one end of the collet. The second coupling portion of the flexible coupling is proximate the second end of the collet. The second coupling portion has the second coupling surface formed thereon. The second coupling surface is configured in a shape complementary to the first coupling surface. The method includes securing the first coupling portion of the draw bar to the second coupling portion of the collet so that the first coupling surfaces moveably engage the second coupling surface. The collet is positioned in the collet adapter. The mounting portion of the draw bar is positioned in the machine tool. The mounting portion is secured to the pulling device and the collet adapter is secured to the spindle. An axial pulling force is applied, via the pulling device, to the draw bar to concentrically seat the collet in the collet adapter such that the first longitudinal axis and the second longitudinal axis are coaxial. The collet adaptor is designed in such a way that is improves the coaxial holding of the collet.

It is contemplated that one or more of the above-mentioned embodiments may be combined.

DETAILED DESCRIPTION OF THE INVENTION

Figure 1:
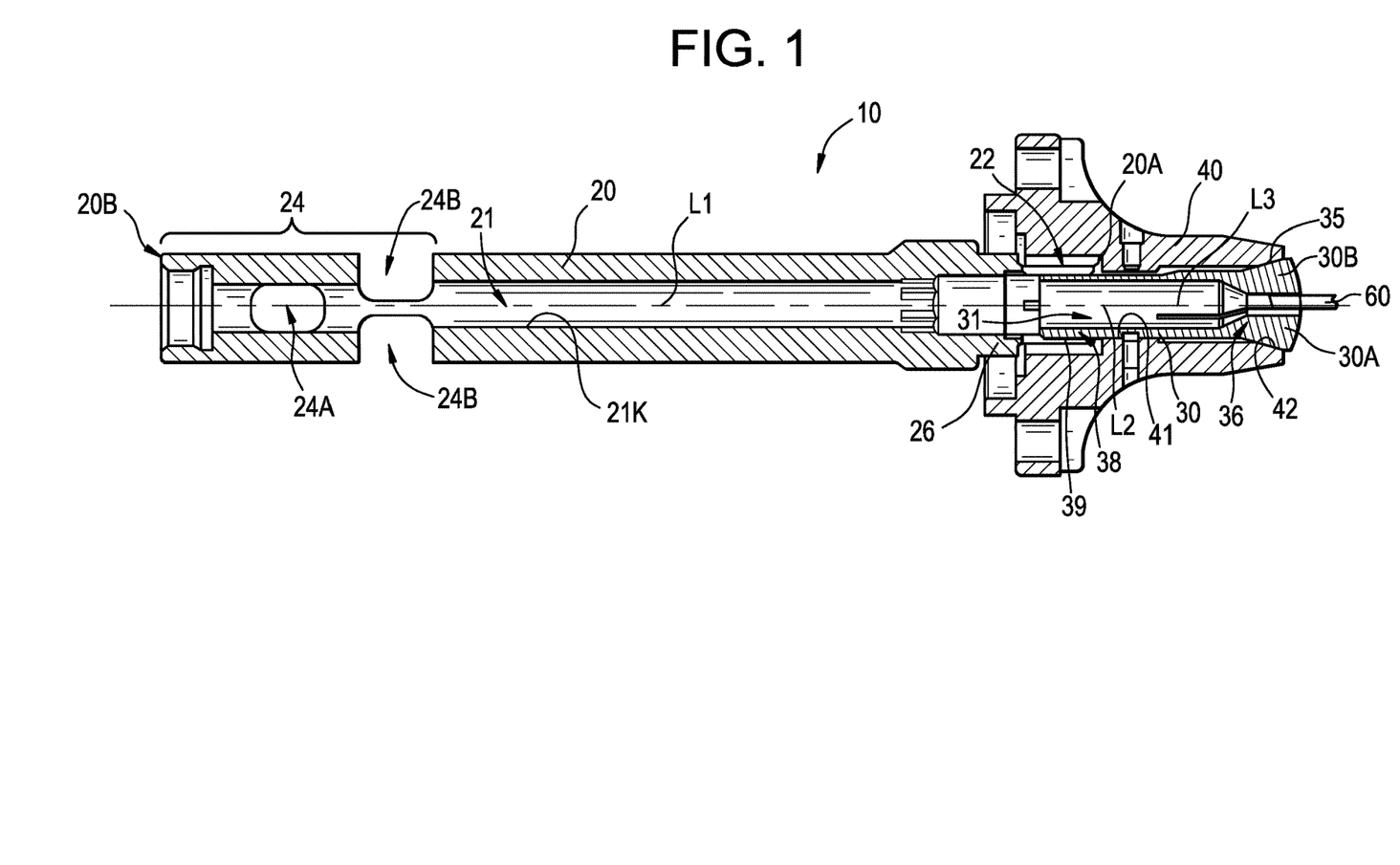
FIG. 1 is a cross sectional view of a collet, collet adaptor and draw bar assembly of the present invention.
Figure 2:
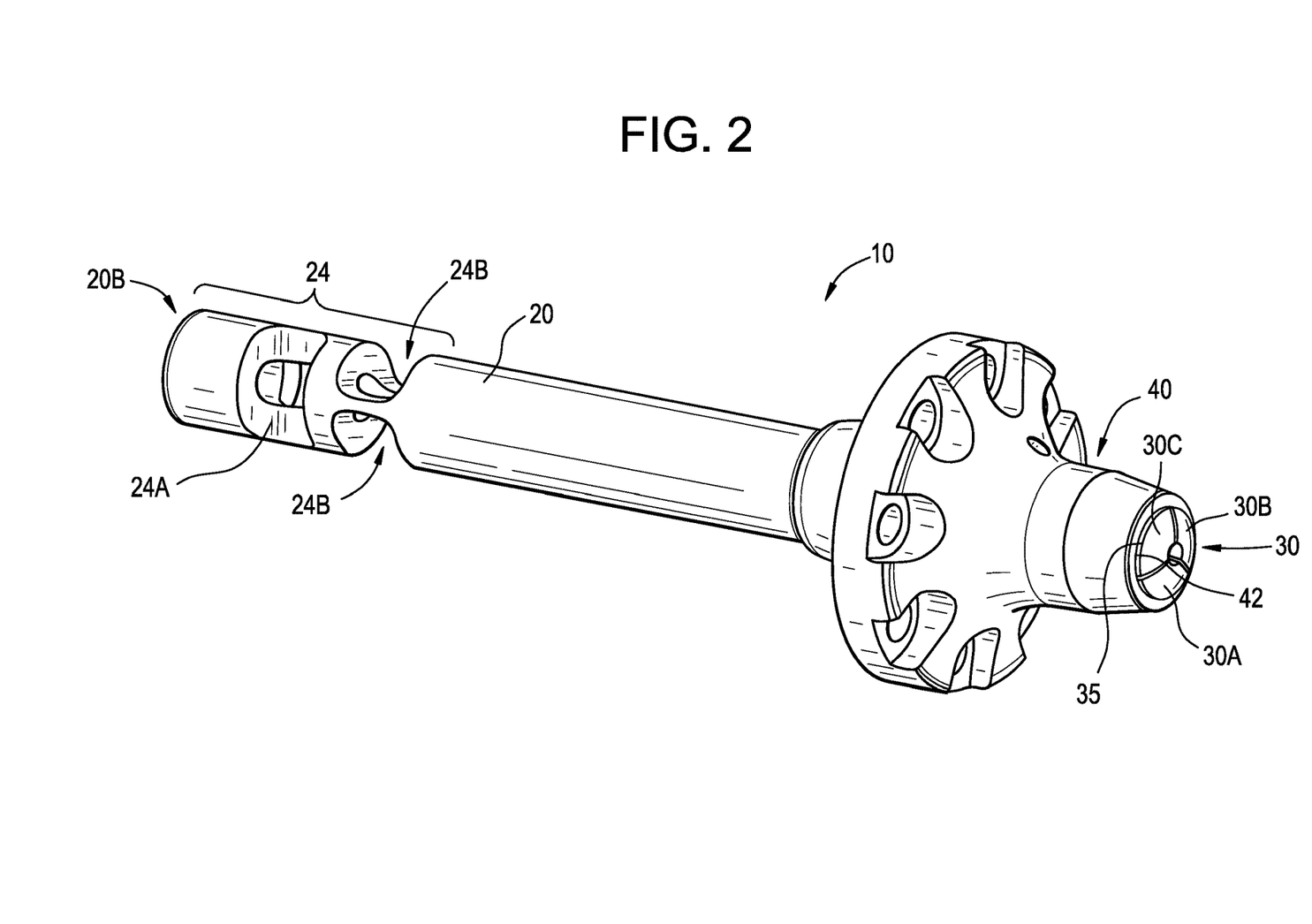
FIG. 2 is a perspective view of the collet, collet adaptor and draw bar assembly of FIG. 1.

Referring to FIGS. 1 and 2, a collet attachment assembly for a machine tool (not shown) is generally designated by the numeral 10. The collet attachment assembly 10 includes a draw bar 20 removably secured to a collet 30. The collet 30 is removably positioned in a collet adapter 40. The draw bar 20 and the collet 30 are secured to one another via a flexible coupling 50 (e.g., a junction, see FIG. 3), as described herein. The draw bar 20, the collet 30 and the collet adapter 40 are manufactured from a suitable metallic material such as steel or a stainless steel. In one embodiment the collet adapter is a fixed type and in another embodiment the collet adapter is an adjustable type.

As shown in FIG. 1, the draw bar 20 includes a first longitudinal axis L1 and a bore 21 defined by an inside surface 21K of the draw bar 20. The draw bar 20 includes a first coupling portion 22 of the flexible coupling 50 proximate one end 20A of the draw bar 20; and a mounting portion 24 proximate an opposite end 20B of the draw bar 20. The mounting portion 24 is configured to removably secure the draw bar 20 to a pulling device (not shown) of a machine tool (not shown). The mounting portion 24 includes a first pair of arcuate grooves 24A and a second pair of arcuate grooves 24B extending radially into the draw bar 20. The first pair of arcuate grooves 24A and the second pair of arcuate grooves 24B cooperate to make the mounting portion 24 flexible (e.g., elastically resilient in response forces applied thereto) to facilitate axial alignment of the spindle with the draw bar 20 along the first longitudinal axis L1.

Figure 4:
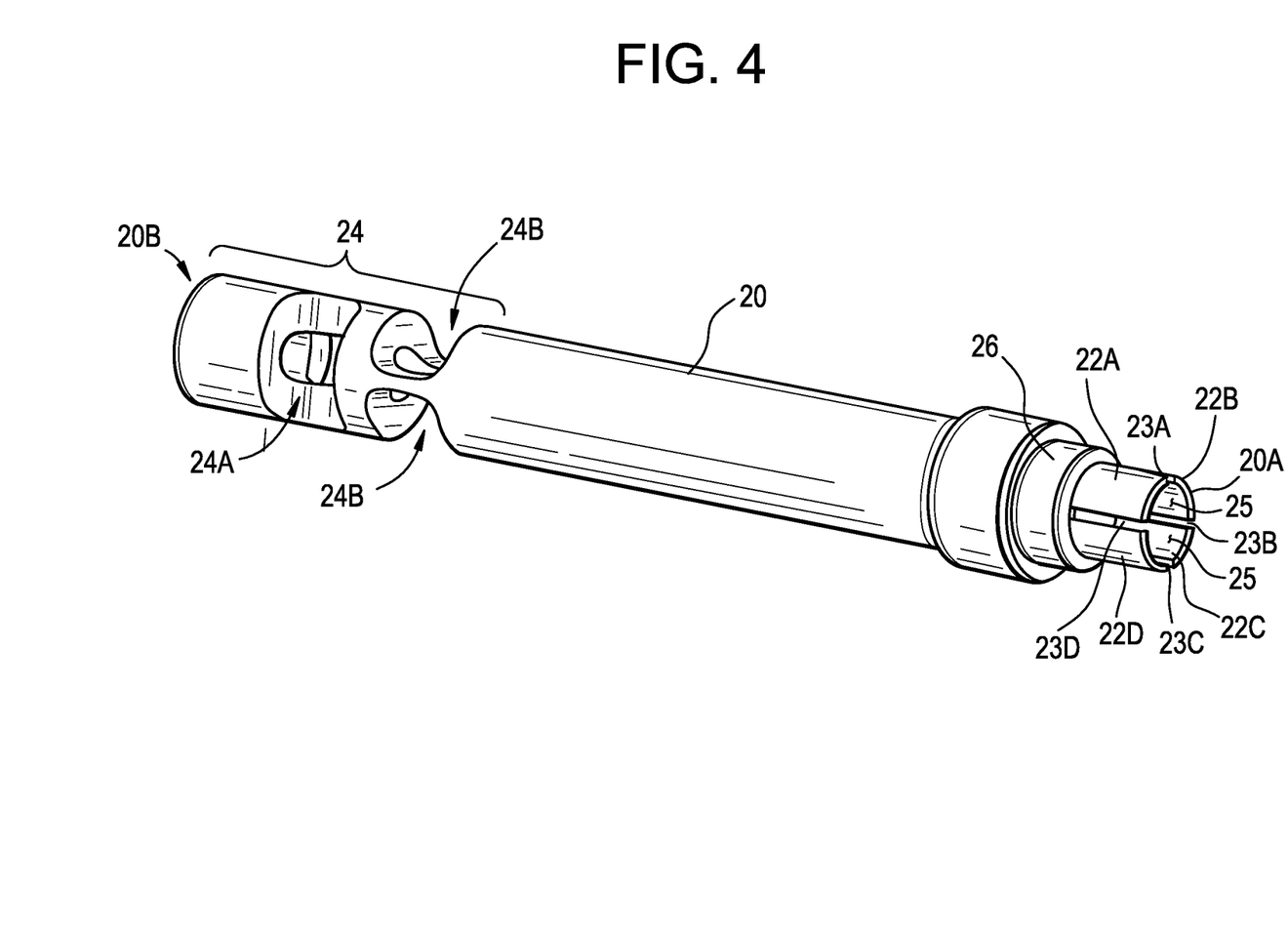
FIG. 4 is a perspective view of the draw bar of FIG. 1.

As best shown in FIG. 4, the first coupling portion 22 of the draw bar 20 includes four legs 22A, 22B, 22C and 22D extending axially away from a collar portion 26 of the draw bar 20. Each pair of adjacent legs (i.e., 22A and 22B, 22B and 22C, 22C and 22D, and 22D and 22A) are spaced apart from one another by a respective axial slot 23A, 23B, 23C or 23D. As illustrated in FIG. 4, each of the legs 22A, 22B, 22C and 22D has first coupling surface 25 formed on an interior surface of thereof. The legs 22A, 22B, 22C and 22D and the axial slot 23A, 23B, 23C or 23D enable the first coupling portion 22 to be flexible (e.g., elastically resilient) and the legs are slightly bent radially inward to create forces to facilitate axial alignment of the collet 30 with the draw bar 20 along the first longitudinal axis L1. While the coupling portion 22 of the draw bar 20 is shown and described as having the four legs 22A, 22B, 22C and 22D, the present invention is not limited in this regard as the draw bar could have more or less legs as shown, and that the legs can be of equal or variable size. While the legs 22A, 22B, 22C and 22D are described as being slightly bent radially inward, the present invention is not limited in this regard as the collet could employ slightly outward bent legs or slightly inward bent legs to obtain the same functionality.

Figure 5:
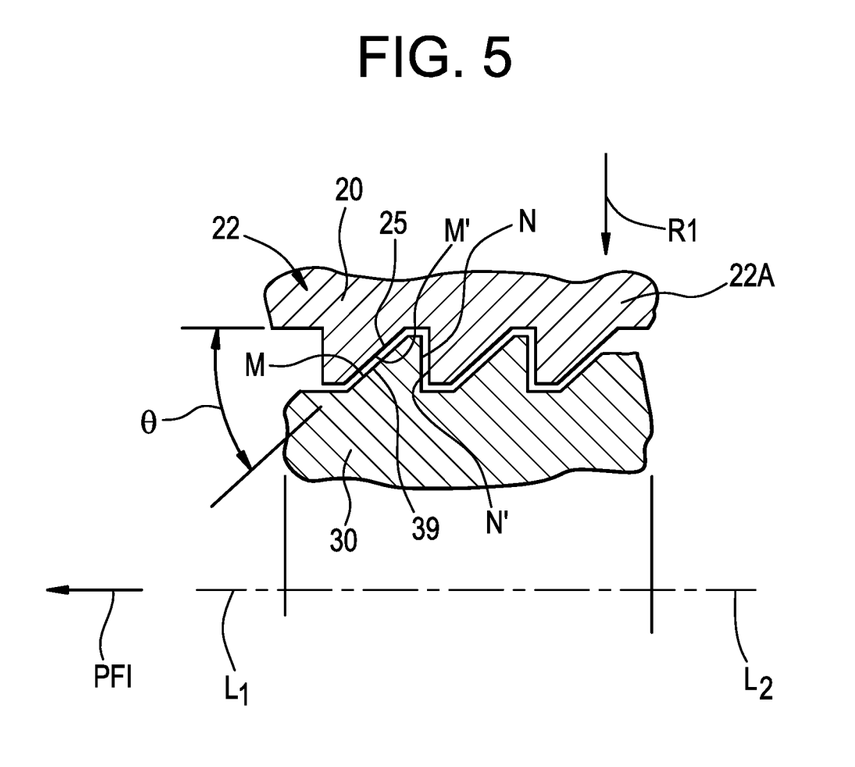
FIG. 5 is a cross-sectional view of a portion of the collet and draw bar of FIG. 3, taken across line 5-5.

In one embodiment, the first coupling surface 25 is an internal thread, such as a buttress type thread illustrated in FIG. 5. While the first coupling surface 25 is shown and described as being an internal thread, the present invention is not limited in this regard as an external thread, retention knob, a radial groove, a flange, bayonet fixtures, or the like, may be employed for the first coupling surface 25.

While the four legs 22A, 22B, 22C and 22D are shown and described as being spaced apart from one another by the respective axial slot 23A, 23B, 23C or 23D, the present invention is not limited in this regard as other configurations may be employed to create a flexible coupling, including but not limited to any number of legs, radial slots, angled slots, tapered thickness of the legs and holes.

Figure 3:
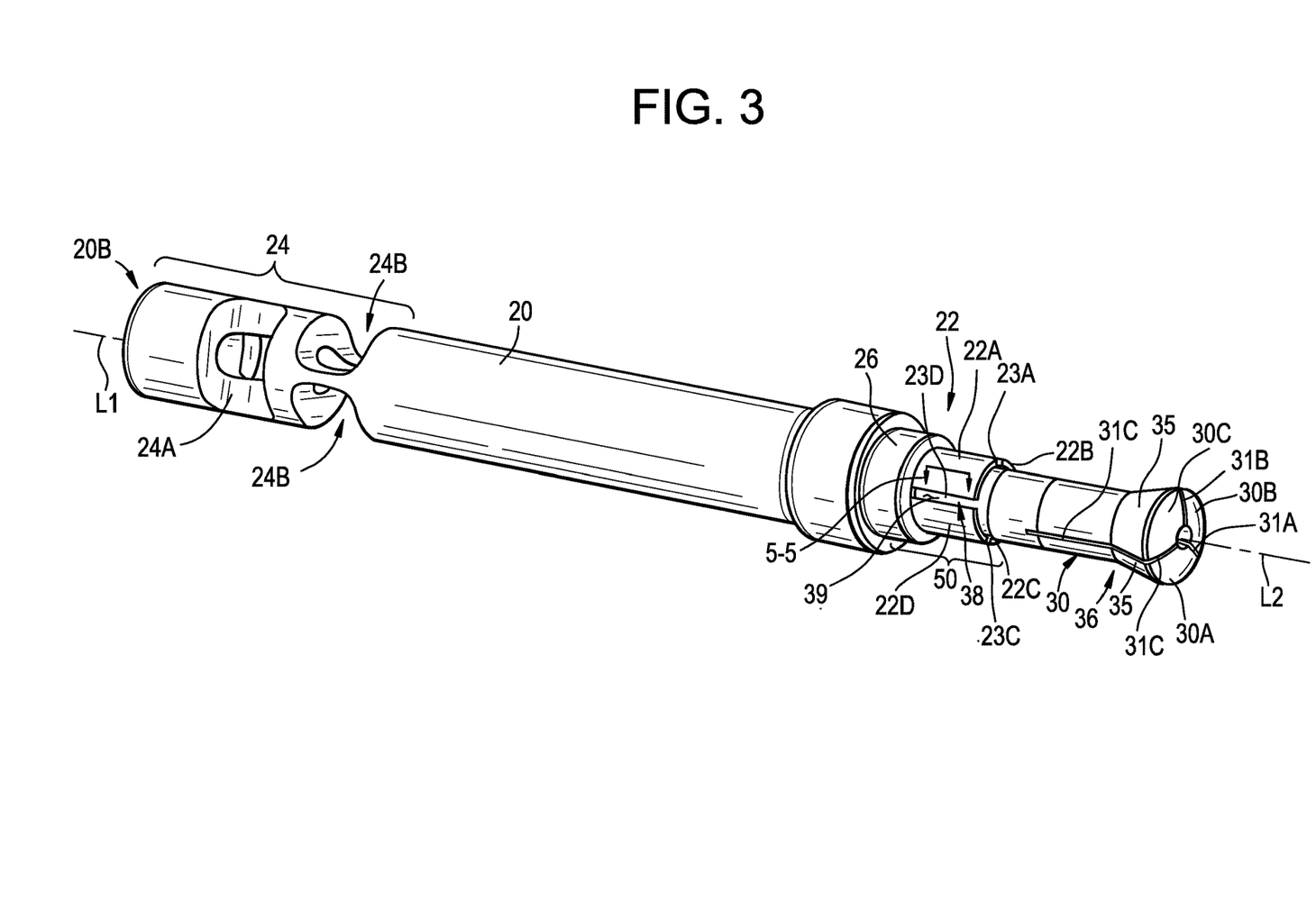
FIG. 3 is a perspective view of the collet and draw bar of FIG. 1.

As best shown in FIG. 1, the collet 30 has a second longitudinal axis L2 and a bore 31 extending therethrough. As best shown in FIG. 3, the collet 30 includes a clamping portion 36 proximate one end of the collet 30; and a second coupling portion 38 of the flexible coupling 50 proximate a second end of the collet 30. The second coupling portion 38 has a second coupling surface 39 formed thereon. The second coupling surface 39 is configured in a shape complementary to the first coupling surface 25, so that the first coupling surfaces 25 moveably engage the second coupling surface 39 such that the first longitudinal axis L1 and the second longitudinal axis L2 are coaxial when an axial force is applied to the draw bar 20 and the collet 30. The second coupling surface 39 is an external thread, such as a buttress type thread illustrated in FIG. 5. While the second coupling surface 39 is shown and described as being an external thread, the present invention is not limited in this regard as an internal thread, retention knob, a radial groove, a flange, bayonet fixtures or the like may be employed for the second coupling surface 39.

As shown in FIG. 3, the clamping portion 36 of the collet 30 includes three flexible fingers 30A, 30B and 30C with axial slots 31A, 31B and 31C extending between adjacent flexible fingers. While the collet is shown and described as having three flexible fingers 30A, 30B and 30C, the present invention is not limited in this regard as the collet could have two fingers, four or more fingers, and fingers could be of equal or variable size. Each of the flexible fingers 30A, 30B and 30C has an angled exterior wedging surface 35 that is configured to wedge into corresponding angled bore 42 of the collet adapter 40 (FIG. 1), in response to an axial force applied by the pulling device (not shown) to the draw bar 20 and the collet 30 through the flexible coupling 50. The wedging surfaces 35 urge the flexible fingers 30A, 30B and 30C radially inward to grasp a tool or workpiece 60.

As shown in FIG. 5, the buttress thread of the first coupling surface 25 and the second coupling surface 39 defines angled non-load bearing flanks M and M' and flat load bearing flanks N and N'. The angled non-load bearing flanks M and M' are orientated at an angle θ (e.g., 45 degrees) relative to a line parallel to the first longitudinal axis L1 and the second longitudinal axis L2, respectively. When an axial pulling force is applied to the draw bar 20 in the direction of the arrow PF1, the collet 30 resists axial movement as a result of the flexible fingers 30A, 30B and 30C being wedged into the angled bore 42 of the collet adapter 40 (shown in FIG. 1). Applying an axial pulling force PF1 causes the loaded flanks N and N' to make contact to transmit the force. The non-loading flanks M and M' keep contact due to the radially inward bent legs 22A, 22B, 22C and 22D in the direction of the arrow R1 to help align the first longitudinal axis L1 with the second longitudinal axis L2. Urging the legs 22A, 22B, 22C, and 22D radially inward in the direction of the arrow R1 eliminates the gap present between the prior art collets and the draw bars, thereby allowing for a more concentric alignment of the collet 30 and draw bar 20 of the present invention as compared to the prior art. Such improved concentricity reduces the run-out tolerance problems compared to the prior art collet and draw bar assemblies. The Applicant has discovered that the transmission of the axial clamping force (draw-in force) is a very important feature in machine tools. If there is a variation of concentricity, then there is also a variation of the contact point and the direction of the draw-in force. The collet 30 is greatly influenced by this and the flexible coupling 50 of the present invention reduces the run-out tolerance on the clamped tool or workpiece 60. In one embodiment, one or more functional surfaces of the least one surface of the draw bar, the collet and the collet adapter is plated to improve the performance of the system.

The present invention includes a method for connecting the collet 30 to the drawbar 20 of the machine tool (not shown). The method includes providing a machine tool having a spindle and a pulling device therein; and providing the collet adapter 40. The method also includes providing the draw bar 20 that has the first longitudinal axis L1 and the first coupling portion 22 of the flexible coupling 50 proximate one end 20A of the draw bar 20. The draw bar 20 includes the mounting portion 24 proximate the opposite end 20B of the draw bar 20. The first coupling portion 22 includes the four legs 22A, 22B, 22C, and 22D spaced apart from one another. The legs 22A, 22B, 22C, and 22D have the first coupling surface 25 formed thereon.

The method also includes providing the collet 30 that has the second longitudinal axis L2 and the clamping portion 36 proximate one end of the collet 30. The second coupling portion 38 of the flexible coupling 50 is proximate the second end of the collet 30. The second coupling portion 38 has the second coupling surface 39 formed thereon. The second coupling surface 39 is configured in a shape complementary to the first coupling surface 25.

The method includes securing the first coupling portion 22 of the draw bar 20 to the second coupling portion 38 of the collet 30 so that the first coupling surfaces 25 moveably engage the second coupling surface 39. The collet 30 is positioned in the collet adapter 40. The mounting portion 24 of the draw bar 20 is positioned in the machine tool. The mounting portion 24 is secured to the pulling device and the collet adapter 40 is secured to the spindle. An axial pulling force is applied, via the pulling device, to the draw bar 20 to concentrically seat the collet 30 in the collet adapter 40 such that the first longitudinal axis L1 and the second longitudinal axis L2 are coaxial.

The method includes the collet adaptor 40 with an angled bore 42 to position the collet and provide the clamping effect when the drawbar 20 is pulled. A guiding surface 41 centers the collet in the collet adaptor helping to obtain the concentricity of axis L1 and L2. The collet adaptor can be a static device as shown here, or an adjustable device where the alignment of the axis L1 and L2 can even be better adjusted (not shown).

Although the invention has been described with reference to particular embodiments thereof, it will be understood by one of ordinary skill in the art, upon a reading and understanding of the foregoing disclosure that numerous variations and alterations to the disclosed embodiments will fall within the scope of this invention and of the appended claims.

What is claimed is:

1. A flexible coupling for attaching a collet to a draw bar, the flexible coupling comprising:
    a draw bar having a first longitudinal axis and a first coupling portion proximate a first end of the draw bar and a mounting portion proximate a second end of the draw bar, the mounting portion being configured to removably secure the draw bar to a pulling device of a machine tool, the first coupling portion comprising at least two elastically resilient legs spaced apart from one another and are configured with a radially inward bend, each of the at least two legs having a first coupling surface formed thereon;
    a collet having a second longitudinal axis and a clamping portion proximate one end of the collet and a second coupling portion proximate a second end of the collet, the second coupling portion having a second coupling surface formed thereon, the second coupling surface being configured in a shape complementary to the first coupling surface so that the first coupling surfaces moveably engage the second coupling surface such that the first longitudinal axis and the second longitudinal axis are coaxial when an axial force is applied to the draw bar and the collet;
    a collet adaptor with a guiding surface and an angled surface being configured to contribute to the coaxial alignment of the collet;
    wherein the first coupling surface has a first threaded area formed thereon and the second coupling surface has a second threaded area formed thereon;
    wherein the first threaded area and the second threaded area are of a buttress thread configuration and the buttress thread configuration defines flat load bearing flanks oriented perpendicular to the first longitudinal axis and angled non-load bearing flanks oriented at an angle relative to the flat flanks, the flat flanks on the first threaded area facing axially away from the first end of the draw bar; and
    wherein the radially inward bends are configured to cause the angled non-load bearing flanks of the first threaded area and the second threaded area to maintain engagement with one another, thereby axially aligning the collet with the draw bar.

2. The flexible coupling of claim 1, wherein:
    the first threaded area is an internal thread and the second threaded area is an external thread; or
    the first threaded area is an external thread and the second threaded area is an internal thread.

3. The flexible coupling of claim 1, wherein the at least two legs are spaced apart from one another by at least two slots.

4. The flexible coupling of claim 3, wherein the at least two slots are one of axially extending, radially extending, and angularly extending.

5. The flexible coupling of claim 1, wherein at least one surface of the draw bar, the collet and the collet adapter is plated to improve the performance of the system.

6. The flexible coupling of claim 1, wherein the collet adapter is one of a fixed type or an adjustable type.

7. The flexible coupling according to claim 1, wherein the at least two legs comprise at least four legs.

8. A method for connecting a collet to a draw bar of a machine tool, the method comprising:

providing a machine tool having a spindle and a pulling device;

providing a collet adapter;

providing a flexible coupling comprising a draw bar having a first longitudinal axis and a first coupling portion proximate a first end of the draw bar and a mounting portion proximate a second end of the draw bar, the mounting portion being configured to removably secure the draw bar to the pulling device, the first coupling portion comprising at least two elastically resilient legs spaced apart from one another, each of the at least two legs having a first coupling surface formed thereon and being configured with a radially inward bend, and a collet having a second longitudinal axis and a clamping portion proximate one end of the collet and a second coupling portion proximate a second end of the collet, the second coupling portion having a second coupling surface formed thereon, the second coupling surface being configured in a shape complementary to the first coupling surface;

wherein the first coupling surface has a first threaded area formed thereon and the second coupling surface has a second threaded area formed thereon;

wherein the first threaded area and the second threaded area are of a buttress thread configuration and the buttress thread configuration defines flat load bearing flanks oriented perpendicular to the first longitudinal axis and angled non-load bearing flanks oriented at an angle relative to the flat flanks, the flat flanks on the first threaded area facing axially away from the first end of the draw bar; and securing the first coupling portion of the draw bar to the second coupling portion of the collet so that the first coupling surfaces moveably engage the second coupling surfaces;

the radially inward bends causing the angled non-load bearing flanks of the first threaded area and the second threaded area to maintain engagement with one another, thereby axially aligning the collet with the draw bar;

positioning the collet in the collet adapter;

positioning the mounting portion of the draw bar in the machine tool;

securing the mounting portion to the pulling device;

securing the collet adapter to the spindle; and applying a radial force, via the inwardly bent legs to the draw bar to concentrically seat the collet in the collet adapter such that the first longitudinal axis and the second longitudinal axis are coaxial.

9. The method according to claim 8, wherein:

the first threaded area is an internal thread and the second threaded area is an external thread; or the first threaded area is an external thread and the second threaded area is an internal thread.

10. The method according to claim 8, wherein the at least two legs are spaced apart from one another by at least two slots.

11. The method according to claim 8, wherein the at least two slots are one of axially extending, radially extending, and angularly extending.

* * * * *